United States Patent Office 2,732,664
Patented Jan. 31, 1956

2,732,664
METHOD OF TREATING CHRISTMAS TREES

Leonard A. De Klotz, Portland, Oreg.

No Drawing. Application December 22, 1952,
Serial No. 327,450

5 Claims. (Cl. 47—58)

This invention relates generally to the treatment of Christmas trees and particularly to a method of treating Christmas trees to reduce the needle loss and increase the fire resistance of the tree, as well as to keep the trees green for a longer period after cutting.

It is well known that attempts have been made to stop evaporation by keeping the tree trunks in water, as well as by spraying the tree top with a chemical solution for the purpose. Such trees were improved as to fire resistance but were found to shed their needles earlier.

Another method involves the immersion of a tree trunk in some sealing or fire resistant solution. This, too, was found to cause the early loss of needles and rapid discoloration of the remaining needles and branches.

With my method there is combined the surface spraying of the foliage and branches with the absorption through the base of the tree trunk of a chemical solution.

For best results the trees should be treated as soon as possible after being cut. This treatment will not rejuvenate a tree which has started to dry out to the extent of losing its needles.

The process consists of preparing a water solution of a chemical, such as calcium chloride, the ratio of which may be from ten to forty per cent by weight of the solution being calcium chloride, the preferred ratio being 17.6% by weight. Variations in the concentration of the solution are not too critical.

In the practice of my method the base of the trunk of the tree is cut on a long diagonal or V-cut and the tree is sprayed thoroughly with the above solution. There is in readiness a twenty to forty per cent solution of water and calcium chloride. For ordinary use a 33⅓ per cent solution is best. This proportion is also by weight. The base of the trunk of the sprayed tree is then submerged in the last mentioned solution, in which it is held for not less than four days. Best results are obtained by a seven-day or longer trunk absorption period, the exact time required depending on the conditions under which the tree grew, the species of the tree and the atmospheric conditions after cutting.

It is important that the spraying and absorbing steps be as close together as possible, although which is first is not of major importance.

Under existing methods it is found that, while the trees were taking up the fire retarding chemical, they were losing another good fire retardant, which is water. With my method, the water loss is prevented and, therefore, a desirable tree condition is prolonged. See Bulletin #R1244, "Treating Christmas Trees To Make Them Safe From Fire," by Arthur Van Kleeck, Associate Chemist, Forest Service, Forest Products Laboratory, Madison, Wisconsin.

I claim:

1. A method of treating Christmas trees comprised of applying externally to the branches a solution of calcium chloride and immersing the bottom of the trunk in a similar solution for a period of from two to seven days.

2. A method of treating needle bearing trees comprised of cutting the tree with an elongated cutting surface, then spraying the branches and immersing the cut portion of the trunk in a solution of water and calcium chloride.

3. A method of treating needle bearing trees comprised of progressively cutting the tree trunk to form a large cut area, then immersing the cut end of the tree trunk in a solution of calcium chloride and spraying the branches of the tree with a similar solution, the cutting, spraying and immersing being performed as nearly as possible at the same time.

4. A method of treating needle bearing trees comprised of cutting the tree to expose a large area of its cross section and simultaneously spraying the branches of the tree and charging the cut surface of the tree with solutions of calcium chloride, approximating 17.6% solution for the branches and 33⅓% for the trunk.

5. The method of treating needle bearing cut trees to retard needle loss and increase fire resistance without impairing the fresh appearance of the tree comprising applying a solution of calcium chloride and water externally to the needles and immersing the cut end of the tree trunk in such solution for a period of at least several days.

References Cited in the file of this patent

UNITED STATES PATENTS 2,526,083    Nielsen _____ Oct. 17, 1950

OTHER REFERENCES

Mitchell: J. Forestry, vol. 33, pp. 84–86 (1935).

Forest Service paper mimeographed November 18, 1938, on "Christmas Trees," page 6.

U. S. Dept. Agri. Leaflet 193, pub. 1939, on "Fireproofing Christmas Trees," 5 pp.

Van Kleeck: Southern Lumberman, vol. 161, No. 2033, p. 196 (December 15, 1940).

"New! Chemicolored Christmas Trees," pub. before February 28, 1941, by Halvorson Trees, Inc., Duluth, Minn., 1 sheet.

U. S. Dept. Agri., Forest Service, Forest Prod. Lab. (Madson, Wis.), Technical Note (Processed) 250 on "Treating Spruce and Balsam Fir Christmas Trees To Reduce Fire Hazard." Revised 1949. Four pages.